United States Patent [19]

Arndt et al.

[11] Patent Number: 4,826,671

[45] Date of Patent: May 2, 1989

[54] PREPARATION OF ACICULAR $\alpha$-$FE_2O_3$

[75] Inventors: Volker Arndt, Bobenheim-Roxheim; Rainer Feser, Gruenstadt; Werner Steck, Ludwigshafen; Helmut Jakusch, Frankenthal, all of Fed. Rep. of Germany

[73] Assignee: BASF Aktiengesellschaft, Ludwigshafen, Fed. Rep. of Germany

[21] Appl. No.: 24,564

[22] Filed: Mar. 11, 1987

[30] Foreign Application Priority Data

Mar. 14, 1986 [DE] Fed. Rep. of Germany ....... 3608541

[51] Int. Cl.$^4$ .............................................. C01G 49/06
[52] U.S. Cl. .................................... 423/633; 423/594; 423/595; 423/600; 423/618
[58] Field of Search ............... 423/594, 618, 633, 634, 423/632, 595, 600; 148/105

[56] References Cited

U.S. PATENT DOCUMENTS

| | | | |
|---|---|---|---|
| 3,619,137 | 11/1971 | Ratcliffe | 423/633 |
| 3,910,785 | 10/1975 | Greene et al. | 148/105 |
| 3,912,646 | 10/1975 | Leitner et al. | 423/634 |
| 3,946,103 | 3/1976 | Hund | 423/633 |
| 3,967,986 | 7/1976 | Rau et al. | 148/105 |
| 4,056,410 | 11/1977 | Corradi et al. | 252/62.56 |
| 4,202,871 | 5/1980 | Matsumoto et al. | 423/632 |
| 4,248,907 | 2/1981 | Uehori et al. | 148/122 |
| 4,256,484 | 3/1981 | Rodrian | 75/0.5 AA |
| 4,272,285 | 6/1981 | Horimoto | 75/0.5 AA |
| 4,305,752 | 12/1981 | Dizikes | 148/105 |
| 4,339,425 | 7/1982 | Tokuoka | 423/633 |
| 4,376,714 | 3/1983 | Pingaud | 423/634 |
| 4,379,183 | 4/1983 | Araki et al. | 427/127 |
| 4,414,196 | 11/1983 | Matsumoto et al. | 423/634 |
| 4,457,982 | 7/1984 | Rudolph et al. | 428/403 |

*Primary Examiner*—Anthony McFarlane
*Attorney, Agent, or Firm*—Keil & Weinkauf

[57] ABSTRACT

Finely divided, acicular and pore-free $\alpha$-$Fe_2O_3$ is prepared from iron(III) salts in the presence of one or more organic substances which form complexes with iron-(III) ions, in alkaline suspension, at from 80° to 250° C.

3 Claims, No Drawings

PREPARATION OF ACICULAR α-FE₂O₃

The present invention relates to a process for the preparation of finely divided, dentrite-free and pore-free α-Fe₂O₃ from an iron(III) salt in the presence of substances which form complexes with iron(III) ions, in alkaline suspension, at from 80° to 250° C.

In order to meet the high requirements made with regard to the magnetic particles used for modern magnetic recording media, efforts have recently been made to improve the crystallographic properties of these particles. Fine holes, pores and cavities are particularly undesirable, since these have an adverse effect on the magnetic properties, as is especially the formation of dendrites, which hinder or prevent the required uniform orientation of the particles on the recording medium and reduce the packing density.

The starting material generally used for the preparation of acicular, magnetic particles in acicular α-Fe₂O₃. This is usually obtained by dehydrating acicular α-FeOOH or γ-FeOOH. This process has the above disadvantages, such as the formation of pores, holes and dendrites.

A process for the preparation of improved α-Fe₂O₃ substantially without the stated disadvantages is proposed in German Laid-Open Applications DOS No. 2,849,173 and DOS No. 3,146,982. In this process, acicular α-Fe₂O₃ is synthesized directly from Fe(OH)₃ by heating an aqueous alkaline suspension of the latter at up to 300° C. in the presence of growth regulators. The growth regulators consist of organic compounds which form chelate complexes with iron(III) ions, and change the form of the α-Fe₂O₃ end-product from the normal tabular shape to an acicular shape. These complex formers also react with other metal cations, with the result that the control function which leads to the acicular shape is adversely affected. For example, the presence of cabalt(II) ions during the reaction leads to a substantial shortening of the end-products, so that the length/width ratio is substantially reduced.

It was also known that, by using magnetic materials which are more finely divided for the production of the magnetic recording media, particle noise can be reduced. Thus, the useful dynamic range of the magnetic recording media can be increased as a result of the reduction in noise obtained by using particles which are more finely divided, ie. which have a smaller volume. At the same time, a smoother surface of the magnetic layer can be obtained using more finely divided pigments, and the resulting, improved layer/head distance gives a higher signal level and therefore a further increase in the dynamic range.

It is an object of the present invention to provide magnetic materials which combine these two improvements, in particular a finely divided, acicular and pore-free α-Fe₂O₃ as an intermediate for a magnetic material having the advantageous properties described.

We have found, surprisingly, that this object is achieved by a process for the preparation of finely divided, acicular α-Fe₂O₃ by heating an alkaline, aqueous suspension of iron(III) hydroxide in the presence of one or more organic compounds which form complexes with iron(III) ions, at from 80° to 250° C., and that a particularly finely divided acicular, pore-free and dendritefree α-Fe₂O₃ is obtained, if an iron(III) hydroxide modified with tin(IV) ions is used.

In developing the novel process, we found, surprisingly, that when tin was present the known troublesome influence of other cations, eg. chromium(III) or aluminum(III), was no longer observed. Furthermore, substantially more finely divided products were obtained. This is particularly important for the industrial application of the process, since it makes it possible to reduce the purity requirements with regard to the starting material. It gives improved products as well as reducing the cost of the process. Moreover, the range of use of the process is substantially increased since the simultaneous presence of further cations makes it possible to vary the particle size in a controlled manner and also obtain intermediate values.

According to the invention, the iron(III) salt and the tin(IV) salt are precipitated together from aqueous solution, as the hydroxide. The amount of tin(IV) salt added is advantageously from $10^{-3}$ to $2 \cdot 10^{-2}$ mole per mole of iron(III) salt. A pH of from 7.5 to 8.0 and a temperature of about 60° C. have proven particularly advantageous. The suspension is then stirred at elevated temperatures. It has proven advantageous to continue stirring for about 5 hours at 60° C. and to resuspend the suspension once or repeatedly in cold water after filtration. If warm water is used, the stirring time is appropriately reduced. The resulting iron(III) hydroxide is suspended in water, the complex former or formers are added and the pH is adjusted. The lower limit of the iron concentration is determined by practical considerations and the upper limit by the stirability of the suspension. The iron concentration is advantageously brought to 0.4–1.4 mol/l. The pH is from 8.5 to 12, particularly preferably from 10.5 to 11.5. Substances which form chelate complexes with iron(III) ions aree used as complex formers which influence the crystal shape. Particularly suitable for this purpose are α-hydroxycarboxylic acids and organic phosphonic acids. Within these groups, citric acid, tartaric acid and 1-hydroxyethane-1, 1-diphosphonic acid have proven particularly useful. Their concentration depends on the iron concentration, the pH and the desired geometry of the end product. A total concentration of from $10^{-3}$ to $10^{-2}$ mol/l is preferred. According to the invention, the stirred suspension is heated to a final temperature of from 80° to 250° C., in particular from 90° to 190° C. This may be effected by rapid heating to the final temperature, rapid heating to a threshold value followed by slow heating to the final temperature, or slow heating to the final temperature.

When the synthesis is complete, the acicular, finely divided, pore-free α-Fe₂O₃ is filtered off, washed and dried. Before being further processed, it can be provided with a shape-stabilizing coating in a conventional manner. It is then reduced to magnetite in a conventional manner in a reducing atmosphere, for example in hydrogen and/or by means of organic substances which decompose in the presence of iron oxides, it being advantageous in each case for steam to be present simultaneously in order to avoid reduction to metallic phases. Depending on the reducing agent and duration, which may be from 20 minutes to 3 hours, reduction temperatures of from 300° to 500° C. have proven suitable.

The magnetite obtained as an intermediate can be oxidized in a conventional manner with an oxidizing gas, eg. oxygen or air, at from 180° to 350° C. Depending on the particular oxidation temperature, times of from 10 minutes to 1 hour have proven advantageous. The oxidation conditions should be chosen so that the known irreversible conversion of $\gamma$-$Fe_2O_3$ to $\alpha$-$Fe_2O_3$ is avoided. Depending on the intended use, the magnetic pigment thus obtained can be modified in a conventional manner at the surface with cobalt or cobalt/iron-(II) ions to increase the coercive force.

It is also possible to reduce the starting pigment which may or may not have been shape-stabilized or modified in a conventional manner, by increasing the reduction potential beyond the stage of magnetite, and to use the resulting metallic pigment, after suitable passivation with an organic solvent or by carefully passing air over it, directly as a magnetic pigment.

An important use of the magnetic pigment obtained from the $\alpha$-$Fe_2O_3$ pigments prepared according to the invention is as a magnetic material in the production of magnetic recording media.

Recording media are produced in a conventional manner, and for this purpose the magnetic materials are dispersed in polymeric binders. Suitable binders for this purpose are known compounds, such as homopolymers and copolymers of vinyl derivatives, polyurethanes, polyesters and the like. The binders are used as solutions in suitable organic solvents, which may contain further additives. The magnetic layers are applied to rigid or flexible bases, such as sheets, films and cards.

The Examples which follow illustrate the invention. Percentages are by weight and are based on the overall compound. The magnetic properties of the powder samples are measured using a vibrating sample magnetometer in a magnetic field of 160 kA/m, or in a vibrating sample magnetometer after biasing in a discharge capacitor. The values of the coercive force, Hc, measured in [kA/m], were based on a tap density $\rho$ of 1.2 g/$cm^3$ for the powder measurements. The specific remanence (Mr/$\rho$) and saturation magnetization (Mm/$\rho$) are each stated in [$nTm^3/g$]. The saturation magnetization and remanence of tapes are stated in mT. The geometry of the products was determined from electron micrographs at a magnification of 1:20,000. In this respect, the term needle denotes an elongated shape and not the presence of pointed ends, ie. also includes rectangles, etc. The specific surface area ($SN_2$) was determined according to DIN No. 66,132, using a strohlein areameter (Strohlein, Dusseldorf, FRG) and the one-point difference method due to Haul and Dümbgen.

EXAMPLE 1

5 moles of $Fe(NO_3)_3.9H_2O$ and 0.04 mole of $SnCl_4$ were dissolved in 15 l of water, and 10% strength sodium hydroxide solution was added to the stirred solution at 60° C. until the pH was 8.0. The resulting suspension of doped iron(III) hydroxide (referred to as Fe-$(OH)_3$ below) was stirred for a further 5 hours at 60° C. and then filtered over a filter press. The precipitate was resuspended once in cold water and once again filtered over a filter press. The precipitates thus obtained served as the starting material for the following examples.

EXAMPLES 1.1 to 1.7

The precipitate obtained as described in Example 1 was suspended in water. The suspension was brought to a certain iron concentration, which is defined in terms of moles of $Fe(OH)_3$ per liter of suspension. The complex former or formers were then added to the suspension, and the mixture was brought to the desired pH with sodium hydroxide solution. The ready-prepared reaction mixture was heated to a fairly high temperature while stirring, an autoclave being used for temperatures above 100° C., and a plastic-lined glass apparatus for temperatures below 100° C. The exact conditions in the experiments are shown in Table 1. The end-product was filtered off and dried. Acicular, pore-free $\alpha$-$Fe_2O_3$ which was pure according to the X-ray pattern was obtained in each case.

TABLE 1

| Example | Iron concentration [mol/l] | pH | Complex former [mmol/l](1) | Temp. profile(2) | $SN_2$ [$m^2$/g] | l [μm] | l/d |
|---|---|---|---|---|---|---|---|
| 1.1 | 1.35 | 11.3 | 0.87 Ta. 3.00 Ci | 3 | 31.2 | 0.20 | 6.0 |
| 1.2 | 1.35 | 10.8 | 0.87 Ta. 3.00 Ci | 3 | 31.1 | 0.18 | 5.0 |
| 1.3 | 0.45 | 10.8 | 0.90 Ci. 1.70 Ph | 1 | 32.3 | 0.40 | 10.0 |
| 1.4 | 0.45 | 10.8 | 0.90 Ci. 1.70 Ph | 2 | 30.7 | 0.30 | 9.0 |
| 1.5 | 0.45 | 10.8 | 1.30 Ci. 1.00 Ph | 1 | 33.0 | 0.30 | 10.0 |
| 1.6 | 0.45 | 11.3 | 0.87 Ta. 2.55 Ci | 1 | | 0.25 | 5.6 |
| 1.7 | 0.45 | 10.8 | 2.30 Ph | 1 | | 0.30 | 9.0 |

(1)Ta = tartaric acid, Ci = citric acid, Ph = 1-hydroxyethane-1,1-diphosphonic acid
(2)Temperature profile means:
1 = heating from 20° C. to 170° C. in 10 hours,
2 = reaction for 6 hours at 170° C. and
3 = rapid heating to 70° C., followed by slow heating to 100° C. in the course of 60 hours and stirring for a further 20 hours at 100° C.

EXAMPLE 2

A solution of 5 moles of $Fe(NO_3)_3.9H_2O$ and 0.02 mole of $SnCl_4$ was precipitated as described in Example 1, and working up was carried out as described there. The resulting precipitate was used for the synthesis under the conditions of Example 1.6 and gave finely divided, pore-free $\alpha$-$Fe_2O_3$ needles having l=0.20 μm and l/d=4.0.

EXAMPLE 3

A solution of 5 moles of $Fe(NO_3)_3.9H_2O$ and 0.06 mole of $SnCl_4$ was precipitated as described in Example 1, and working up was carried out as described there. The resulting precipitate was used for the synthesis under the conditions of Example 1.6 and gave finely divided, pore-free $\alpha$-$Fe_2O_3$ needles having l=0.18 μm and l/d=4.5.

EXAMPLE 4

A solution of 5 moles of $Fe(NO_3)_3.9H_2O$, 0.04 mole of $SnCl_4$ and 0.04 mole of $AlCl_3.6H_2O$ was precipitated as described in Example 1, and working up was carried out as described there.

EXAMPLE 4.1 to 4.2

The precipitate obtained in Example 4 was used for the synthesis under the conditions shown in Table 2, and gave finely divided, pore-free $\alpha$-$Fe_2O_3$ needles.

TABLE 2

| Example | Iron concentration [mol/l] | pH | Complex former [mmol/l](1) | Temp. profile(2) | $SN_2$ [$m^2$/g] | l [μm] |
|---|---|---|---|---|---|---|
| 4.1 | 1.35 | 11.3 | 0.87 Ta. 3.00 Ci | 3 | 27.4 | 0.23 |
| 4.2 | 0.45 | 10.8 | 0.90 Ci. 1.70 Ph | 1 | 26.9 | 0.35 |

EXAMPLE 5

A solution of 5 moles of $Fe(NO_3)_3.3H_2O$, 0.04 mole of $SnCl_4$ and 0.02 mole of $CrCl_3.6H_2O$ was precipitated as described in Example 1, and working up was carried out as described there.

EXAMPLES 5.1 to 5.2

The precipitate obtained in Example 4 was used for the synthesis under the conditions shown in Table 3, and gave finely divided, pore-free $\alpha$-Fe$_2$O$_3$ needles.

TABLE 3

| Example | Iron concentration [mol/l] | pH | Complex former [mmol/l][1] | Temp. profile[2] | SN$_2$ [m$^2$/g] | l [μm] |
|---|---|---|---|---|---|---|
| 5.1 | 1.35 | 11.3 | 0.87 Ta. 3.00 Ci | 3 | 25.1 | 0.30 |
| 5.2 | 0.45 | 11.3 | 0.87 Ta. 2.60 Ci | 1 | 23.6 | 0.20 |

EXAMPLE 6

A solution of 5 moles of Fe(NO$_3$)$_3$.9H$_2$O and 0.08 mole of SnCl$_4$ was precipitated as described in Example 1 and stirred for a further 30 minutes at 60° C. The precipitate was resuspended four times in hot water and then filtered off. The resulting precipitate was used for the synthesis under the conditions of Example 1.6 and gave finely divided, pore-free $\alpha$-Fe$_2$O$_3$ spindles having l=0.10 μm and l/d=2.5.

COMPARATIVE EXPERIMENTS 1 to 8

A solution of 5 moles of Fe(NO$_3$)$_3$.9H$_2$O and X moles of AlCl$_3$.6H$_2$O or CrCl$_3$.6H$_2$O (see Table 4) was precipitated as described in Example 1, and working up was carried out as described there. These precipitates were used for the synthesis under the conditions shown in Table 4 and gave pore-free $\alpha$-Fe$_2$O$_3$ products (with the exception of V 6 which had $\alpha$-FeOOH dendrites), the diameter increasing with increasing amount of dopant.

COMPARATIVE EXPERIMENTS 9 and 10

A solution of 5 moles of Fe(NO$_3$)$_3$.9H$_2$O was precipitated as described in Example 1 and filtered over a filter press, and the precipitate was resuspended four times in cold water and filtered off. The resulting precipitate was used for the synthesis under the conditions shown in Table 4 and gave pore-free $\alpha$-Fe$_2$O$_3$.

TABLE 4

| Example | Dopant [x mole] | Iron concentration [mmol/l] | Temp. profile | SN$_2$ [m$^2$/g] | Shape from electron micrograph | l [μm] |
|---|---|---|---|---|---|---|
| V 1 | 0.0148 Al | 1.35 | 3 | 16.2 | Needles | 0.23 |
| V 2 | 0.037 Al | 1.35 | 3 | 14.8 | Needles | 0.30 |
| V 3 | 0.148 Al | 1.35 | 3 | 11.2 | Needles | 0.36 |
| V 4 | 0.0078 Cr | 1.35 | 3 | 15.8 | Needles | 0.25 |
| V 5 | 0.0193 Cr | 1.35 | 3 | 10.4 | Needles | 0.34 |
| V 6 | 0.0769 Cr | 1.35 | 3 | 12.8 | Needles with fine dendrites | 0.35 / 0.30 |
| V 7 | 0.037 Al | 0.45 | 1 | 13.0 | Spindles | |
| V 8 | 0.0193 Cr | 0.45 | 1 | 12.9 | Needles | 0.50 |
| V 9 | — | 1.35 | 3 | 16.3 | Needles | 0.25 |
| V 10 | — | 0.45 | 1 | 11.0 | Needles | 0.29 | pH = 11.3, 0.87 mmol/l of tartaric acid and 3.0 mmol/l of citric acid

EXAMPLE A1

2.5% of stearic acid were added to 80 g of product from Example 1.5, and the said product was reduced to magnetite in a rotary tubular furnace for 30 minutes at 380° C. in a 1:1 hydrogen/nitrogen stream. Before entering the reduction tube, the H$_2$ stream was passed through water at 60° C.–80° C. When the reduction was complete, the magnetite sample was oxidized to $\alpha$-Fe$_2$O$_3$ in a furnace of similar design for 30 minutes at 280° C. with air. The product had a coercive force of 18.6 kA/m and a specific remanence of 41.7 nTm$^3$/g.

The resulting magnetic pigment was provided in a conventional manner, on the surface, with 4.5% of Co and 13.5% of Fe(II) in the form of their hydroxides by stirring for four hours at 50° C. and at a pH greater than 12. The product was then filtered off, dried, and heated for one hour at 200° C. under nitrogen. The end-product had a coercive force of 47.0 kA/m and a specific remanence of 45.1 nTm$^3$/g.

EXAMPLE A2

80 g of the product from Example 1.5 were provided with a coating of 0.8% of phosphate by heating in dilute phosphoric acid. The product was filtered off, dried and then converted to $\alpha$-Fe$_2$O$_3$ as described in Example A1 but at a reduction temperature of 450° C. The product had a coercive force of 22.8 kA/m and a specific remanence of 38.8 nTm$^3$/g.

The resulting magnetic pigment was provided in a conventional manner, on the surface, with a coating of 0.8% of Co in the form of the hydroxide by stirring for four hours at 95° C. and at a pH greater than 12. The product was then filtered off and dried. The end-product had a coercive force of 27.7 kA/m and a specific remanence of 38.5 nTm$^3$/g.

EXAMPLE A3

The product prepared in Example 1.3 was provided with 1.8% of SiO$_2$ in aqueous suspension with the addition of waterglass solution, and the product was filtered off and dried. It was then reduced with hydrogen for 8 hours at 440° C. The resulting pyrophoric metallic pigment was passivated with tetrahydrofuran. The passivated product had the following properties: H$_c$=76.2 kA/m, M$_m$/p=121 nTm$^3$/g. When reduction was carried out at other temperatures, the passivated product had the following properties: 410° C.: H$_c$=72.2 kA/m; 425° C.: H$_c$=83.7 kA/m.

We claim:

1. A process for the preparation of acicular $\alpha$-Fe$_2$O$_3$ comprising
    precipitating iron(III) hydroxide from an aqueous solution of iron(III) salt in the presence of tin(IV) ions by adding an alkali metal hydroxide to an aqueous iron(III) salt solution containing from 10$^{-3}$ to 2.10$^{-2}$ mole of tin(IV) salt per mole of iron(III) salt,
    filtering off the resulting precipitate,
    suspending the precipitate in water to form an aqueous suspension of iron(III) hydroxide, and
    heating the aqueous suspension of iron(III) hydroxide at a temperature of from 80° to 150° C., at a pH of from 8.5 to 12, in the presence of an amount of at least one organic compound sufficient to form complexes with iron(III) ions whereby acicular $\alpha$-Fe$_2$O$_3$ is formed.

2. The process of claim 1 wherein after filtering, the precipitate is suspended in water at least one time, while stirring, at a temperature not exceeding 100° C., and the precipitate is filtered off.

3. The process of claim 1 wherein the iron(III) hydroxide is precipitated from an aqueous solution of iron(III) salt in the presence of chromium(III) ions, aluminum(III) ions or mixture thereof, in addition to said tin(IV) ions.

* * * * *

UNITED STATES PATENT AND TRADEMARK OFFICE
CERTIFICATE OF CORRECTION

PATENT NO. : 4,826,671

DATED : May 2, 1989

INVENTOR(S) : ARNDT, Volker; FESER, Rainer; STECK, Werner; JAKUSCH, Helmut;

It is certified that error appears in the above-identified patent and that said Letters Patent is hereby corrected as shown below:

IN THE CLAIMS

Claim 1, column 6, line 54:

"80° to 150°C." should read --80° to 250°C.--.

Signed and Sealed this

Eighth Day of May, 1990

Attest:

Attesting Officer

HARRY F. MANBECK, JR.

Commissioner of Patents and Trademarks